United States Patent [19]
Yoshioka

[11] Patent Number: 5,237,456
[45] Date of Patent: Aug. 17, 1993

[54] PROJECTION LENS
[75] Inventor: Takayuki Yoshioka, Tokyo, Japan
[73] Assignee: Pioneer Electronic Corporation, Tokyo, Japan
[21] Appl. No.: 824,772
[22] Filed: Jan. 23, 1992
[30] Foreign Application Priority Data
Apr. 11, 1991 [JP] Japan ................ 3-078962
[51] Int. Cl.$^5$ .................. G02B 3/00; G02B 3/02; G02B 9/62
[52] U.S. Cl. ............... 359/649; 359/757; 359/713
[58] Field of Search .......... 359/649, 757, 713
[56] References Cited
U.S. PATENT DOCUMENTS

| 4,761,063 | 8/1988 | Yoshioka et al. | 359/649 |
| 4,792,217 | 12/1988 | Yoshioka | 359/649 |
| 4,989,961 | 2/1991 | Yoshioka | 359/649 |
| 4,993,816 | 2/1991 | Yoshioka et al. | 359/649 |

Primary Examiner—Bruce Y. Arnold
Assistant Examiner—Evelyn A. Lester
Attorney, Agent, or Firm—Sughrue, Mion, Zinn, Macpeak & Seas

[57] ABSTRACT

A projection lens consists of a first lens group including a positive lens, a second lens group including a meniscus type lens having a comparatively low refractive power, a third lens group including a bonded negative lens, a fourth lens group including a double convex lens, a fifth lens group including a lens having a comparatively low positive refractive power and a sixth lens group including a negative lens having a concave surface at the screen side, whereby, when a lens power of the whole lens system is 1 and a lens power of each lens group is designated by $\psi_X(1-6)$, respective lens powers will be given by the following a-e:

$$0.1 < \psi_1 < 0.6 \qquad a$$

$$-0.2 < \psi_2 < 0.2 \qquad b$$

$$-0.5 < \psi_3 < -0.1 \qquad c$$

$$1.0 < \psi_{4,5} < 1.5 \qquad d$$

$$-1.3 < \psi_6 < -0.7 \qquad e$$

thus providing a temperature compensation by partly employing plastic component lenses for minimizing the efficiency from worsening, and then provided is a light weight projection lens with only six lens group while maintaining a high aperture ratio and high imaging power such as suited for a high definition television system.

11 Claims, 12 Drawing Sheets

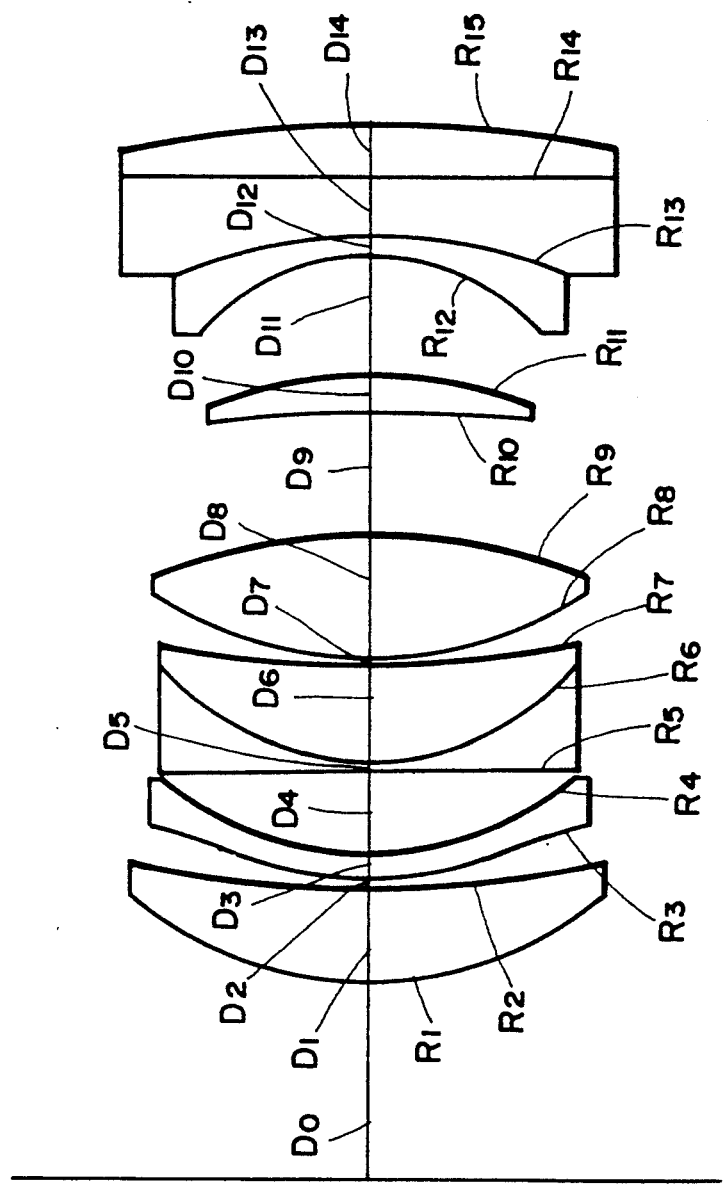
F I G. 9

PROJECTION LENS

BACKGROUND OF THE INVENTION

1. Field of the Invention

This invention relates to a projection lens and, more particularly, to a projection lens for projecting an image displayed on a projection tube for use in a projection television system.

2. Description of the Prior Art

In a projection television system, three primary color images of red, green and blue displayed on three projection cathode-ray tubes are projected on a screen by means of three projection lenses for displaying a large-sized color pictures. In such projection television system, it has been required to adopt a high performance projection lens having a large angle of view, large aperture ratio and high capability of image formation in view of providing a thin and compact projection television receiving set.

Consequently, there have been proposed many kinds of projection lenses in the past, such as a projection lens composed of all glass component lenses to maintain high quality through tight machinery tolerances, a projection lens composed of all plastic component lenses to obtain a large aperture ratio as well as to decrease the cost of production and a hybrid projection lens composed of glass component lenses and aspheric plastic component lenses.

However, there have been some problems in the prior-art projection lens, such as of all glass component lenses, that if an imaging power is increased while maintaining a large aperture ratio, a number of component lenses should be increased, thus resulting in the high cost of production and, to make matters worse, a performance at the peripheral portion of the lens will be decreased rapidly.

Further, as to the prior-art projection lens such as of all aspheric plastic component lenses, there have been different problems such that the tight machinery tolerance is not expected like in the machinery for glass component lenses, this in turn makes the manufactured lens unable to perform the intended performance as designed, and thereby causing a change in the refractive index, or even in a shape, of component lenses due to a change of temperatures, thus resulting in a displacement of a focal point for decreasing the imaging power.

It is therefore an object of this invention to eliminate the problems encountered by the prior-art projection lenses and to provide a projection lens not increased in number of component lenses in spite of having a large aperture ratio, not decreased in peripheral performance and that not decreased in imaging power by a change of atmospheric temperatures.

SUMMARY OF THE INVENTION

A projection lens in accordance with this invention consists of, from a projection screen side in order, a first lens group including a positive lens, a second lens group including a meniscus type lens having a comparatively low refractive power, a third lens group including a bonded negative lens, a fourth lens group including a double convex lens, a fifth lens group including a lens having a comparatively low positive refractive power and a sixth lens group including a negative lens having a concave surface at the screen side, whereby the objective of the projection lens can be achieved by selecting lens powers of respective lens groups as follows: when, $\psi_1$; lens power of the first lens group
$\psi_2$; lens power of the second lens group
$\psi_3$; lens power of the third lens group
$\psi_{4,5}$; combined lens power of the fourth and fifth lens groups
$\psi_6$; lens power of the sixth lens group
(where, the lens power of the whole lens system is 1)
then, the respective lens powers will be given by:

$$0.1 < \psi_1 < 0.6 \quad \text{a}$$

$$-0.2 < \psi_2 < 0.2 \quad \text{b}$$

$$-0.5 < \psi_3 < -0.1 \quad \text{c}$$

$$1.0 < \psi_{4,5} < 1.5 \quad \text{d}$$

$$-1.3 < \psi_6 < -0.7 \quad \text{e}$$

In accordance with this invention, when one of the bonded lens that constitutes the third lens group is given by:

$\psi_{3X}$; lens power of one side of the bonded lens which constitutes the third lens group (where, the lens power of the whole lens system is 1)
$\nu_{3X}$; Abbe's number of the lens specified above.

The lens power of a projection lens in accordance with one aspect of this invention will be given by:

$$-0.7 < \psi_{3X} < 0$$

$$\nu_{3X} < 40.$$

In accordance with another aspect of this invention, at least each one surface of component lenses which constitutes at least the second and fifth lens groups out of the second, fifth and sixth lens groups in the projection lens described above is formed into an aspheric surface.

In accordance with still another aspect of this invention, at least the second and fifth lens groups out of the second, fifth and sixth lens groups in the projection lens described above are composed of plastic component lenses and, when:

$\psi_5$; lens power of the fifth lens group
(where, the lens power of the whole lens system is 1)
then, the lens power will be:

$$0 < \psi_5 < 0.4$$

In accordance with yet another aspect of this invention, arranged is a projection cathode-ray tube in the proximity of the sixth lens group of each projection lens as defined hereinabove, and thereby a display screen of the projection cathode-ray tube is formed into a concave spherical or aspheric shape at the side facing to the projection screen.

According to further aspect of this invention, at least component lenses of the first, second, third and fifth lens groups out of the component lenses that constitute the first, second, third, fifth and sixth lens groups of the projection lens specified in the second aspect are composed of plastic lenses and the lens power of the fifth lens group will be:

$$0 < \psi_5 < 0.4$$

According to still further aspect of this invention, at least each one surface of the component lenses of, at least, the second and fifth lens groups out of the component lenses that constitute the first, second, third, fifth and sixth lens groups in the foregoing is formed into an aspheric surface, or thereby the projection cathode-ray tube is placed in the proximity of the sixth lens group, wherein a display screen of the projection cathode-ray tube is formed into a concave spherical or aspheric shape at the side facing to the projection screen.

In accordance with the present invention, one side of the bonded lenses of the third lens group of the projection lens is given by:

$$-0.7 < \psi_{3X} < 0$$

$$\nu_{3X} < 40$$

for providing an achromatic lens. With the condition as described above, the better achromatization of the lens can be achieved in cooperation with the other convex lens. Moreover, together with the cooperation of the condition of $0.1 < \psi_1 < 0.6$, a focus drift due to a temperature variation can also be kept minimum, thus improving a focusing characteristic of the projection lens against the temperature variation.

Further, in the second and fifth lens groups, at least one surface of the component lenses of each lens group may be made aspheric and this requires to provide the second and fifth lens groups by utilizing plastic lenses and that the lens power should be:

$$0 < \psi_5 < 0.4$$

for providing the second and fifth lens groups compensated for a sagital comatic aberration of the front lens group and a meridional comatic aberration of the rear lens group.

Consequently, if all the conditions as defined in the present invention are not fulfilled, the objectives, such as providing a high aperture ratio, a low number of component lenses, no deterioration of the peripheral performance and no worsening in imaging power due to temperature variation, are not attained by the projection lens in accordance with this invention.

BRIEF DESCRIPTION OF THE DRAWINGS

FIG. 9 is a side view of a fifth embodiment of this invention;

DETAILED DESCRIPTION OF THE PREFERRED EMBODIMENTS

Figure 1:
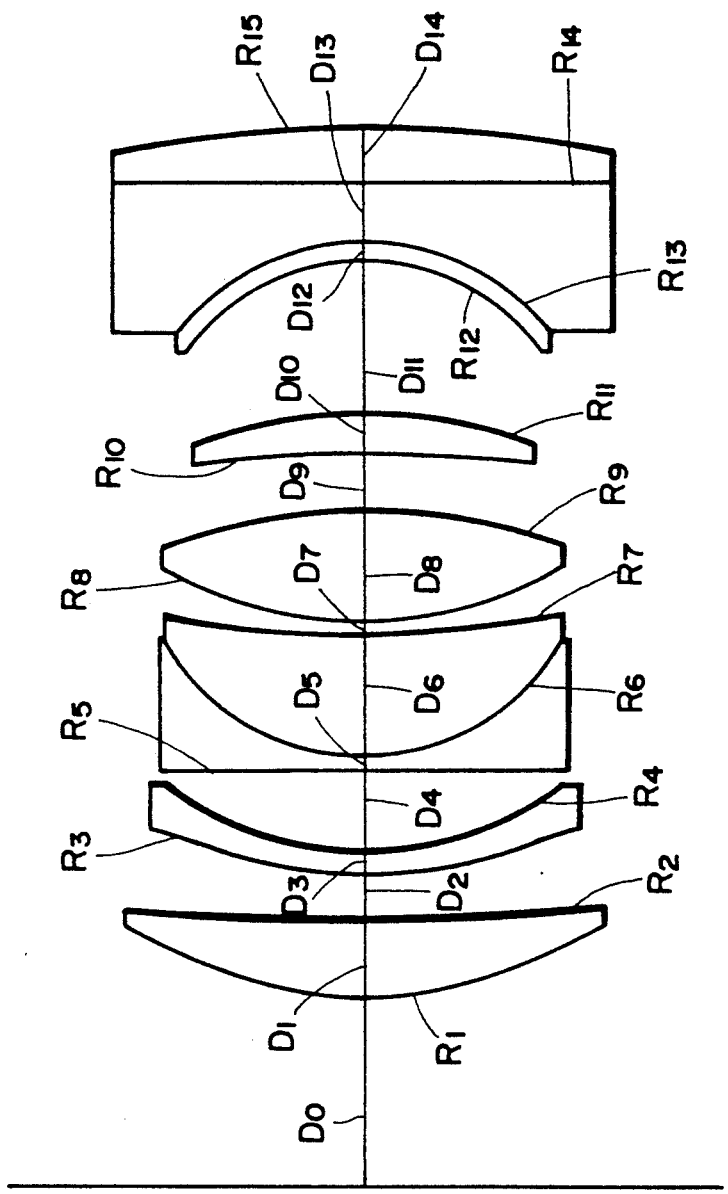
FIG. 1 is a side view of a first embodiment of this invention.
Figure 2:
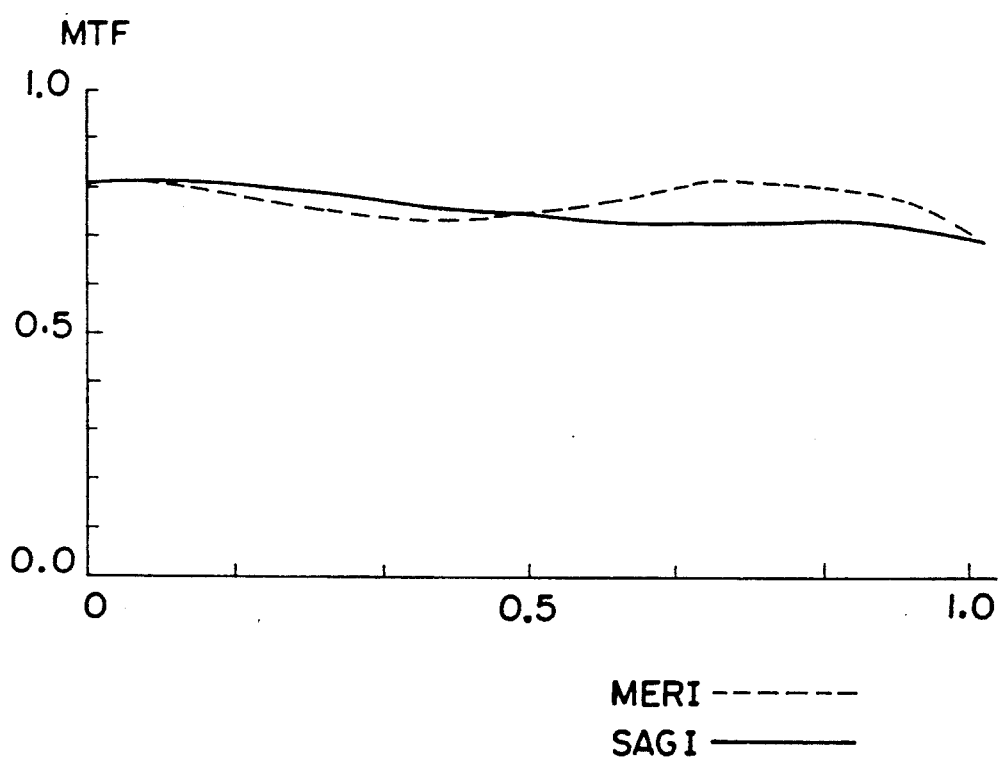
FIG. 2 is a diagram showing an optical transfer function (OTF) against a monochromatic light-ray of the embodiment of FIG. 1.
Figure 3:
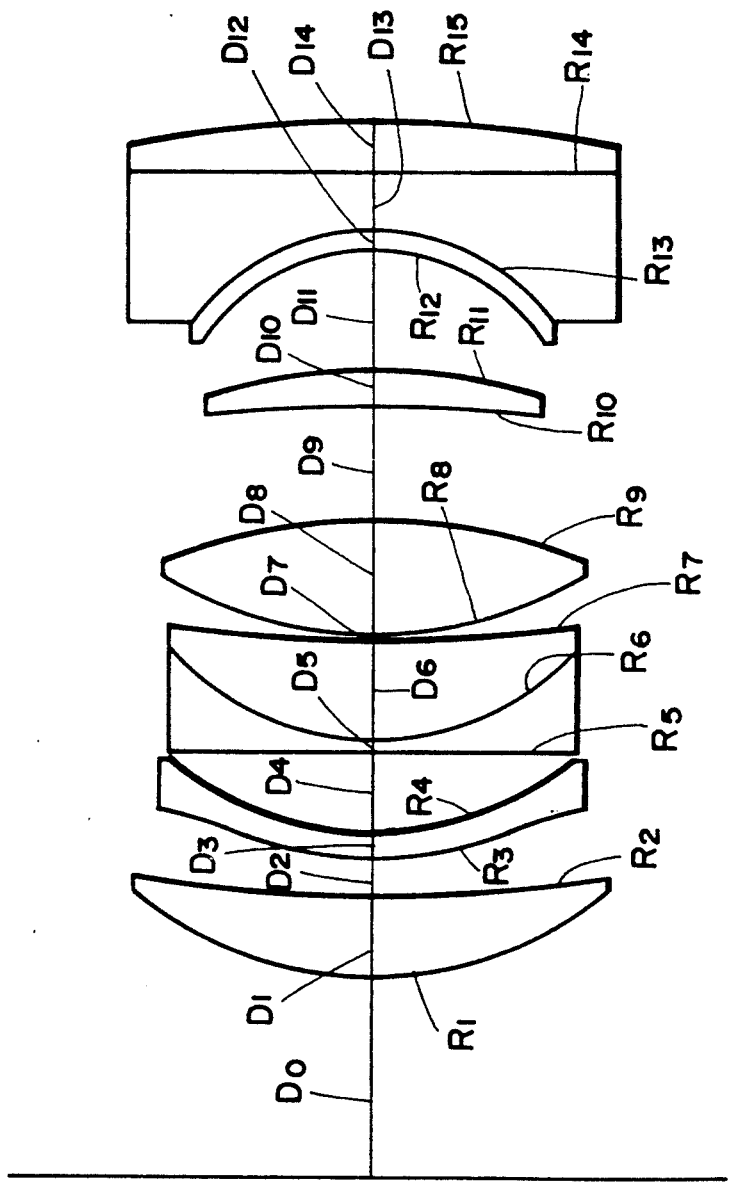
FIG. 3 is a side view of a second embodiment of this invention.
Figure 4:
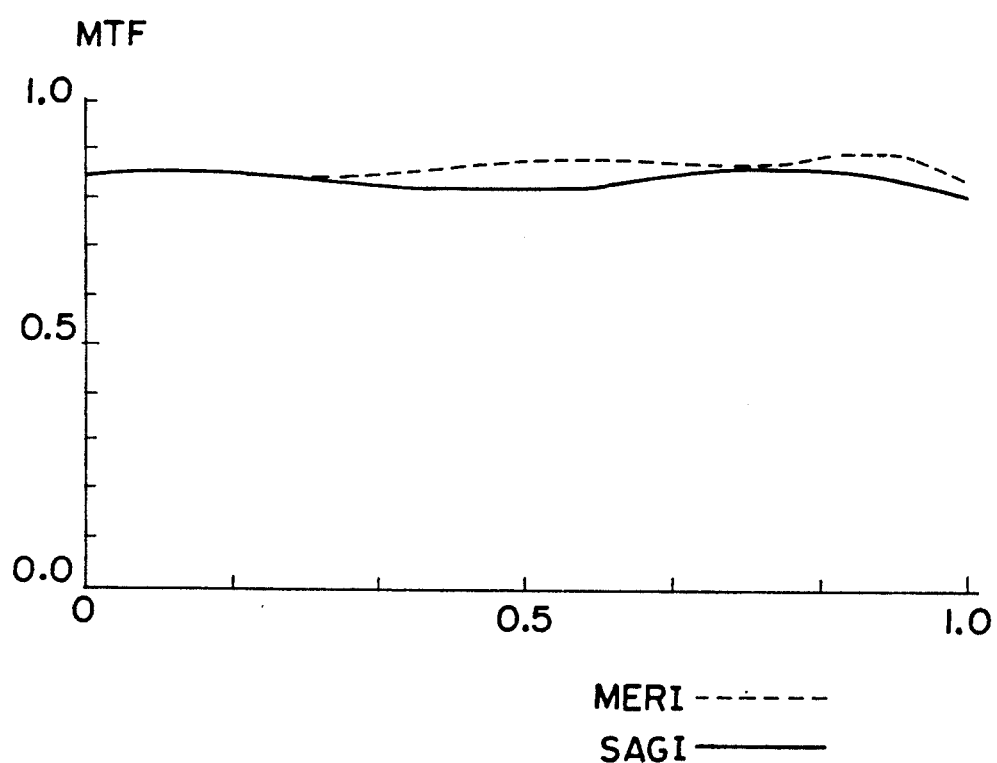
FIG. 4 is a diagram showing an optical transfer function (OTF) against the monochromatic light-ray of the embodiment of FIG. 3.
Figure 5:
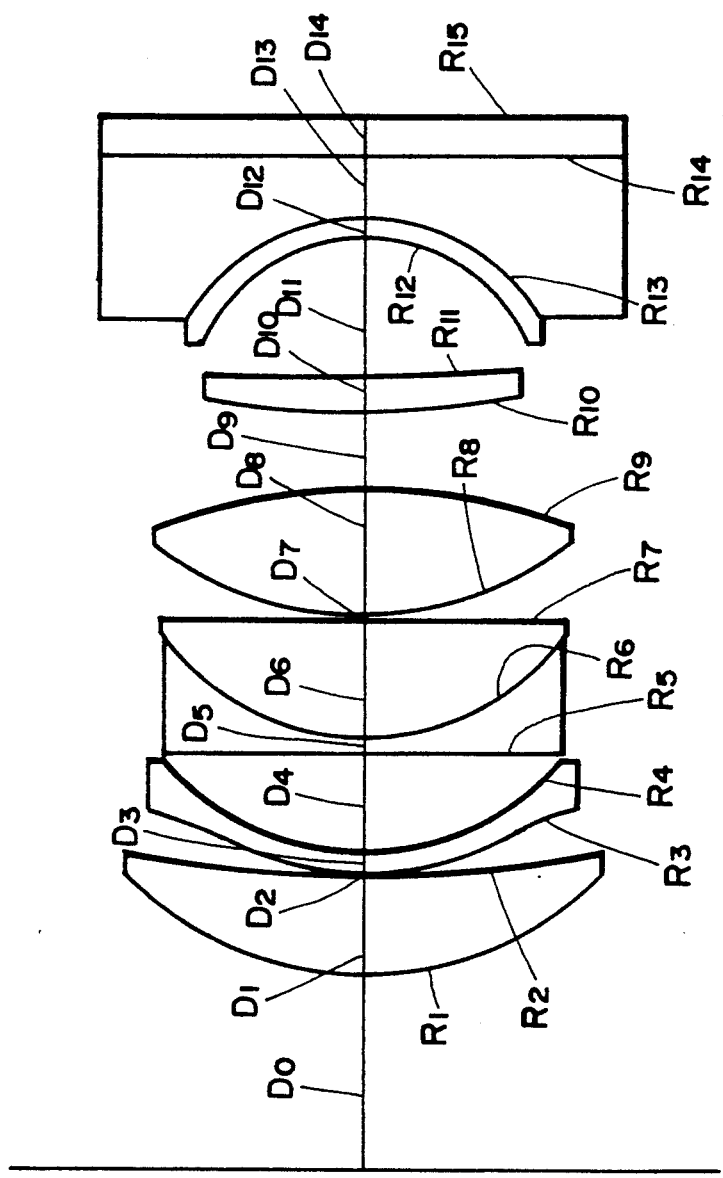
FIG. 5 is a side view of a third embodiment of this invention.
Figure 6:
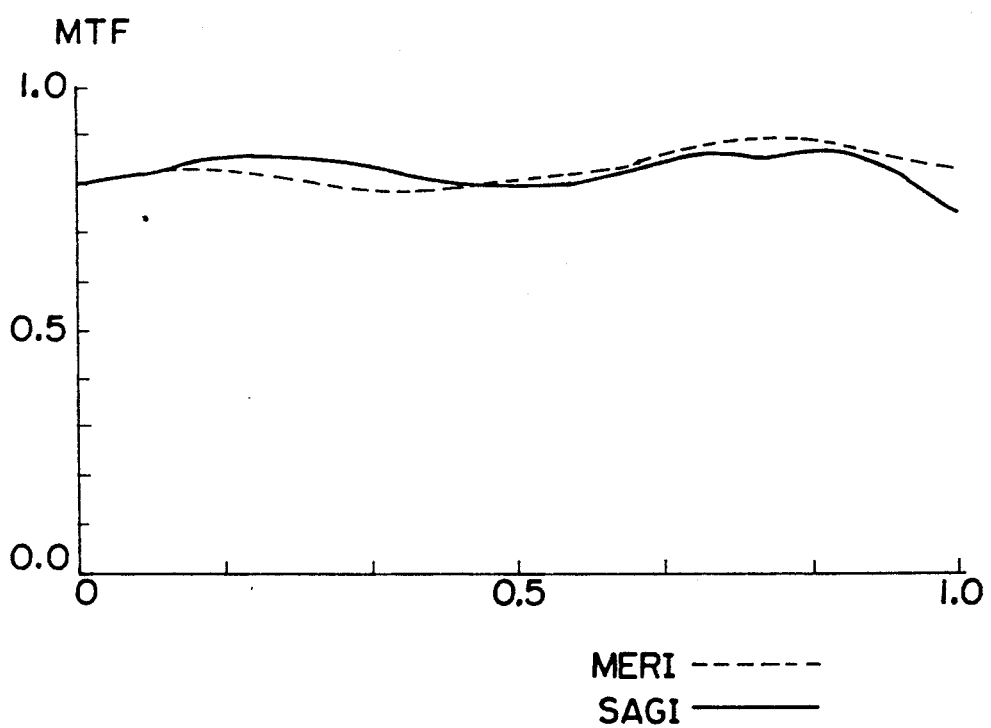
FIG. 6 is a diagram showing an optical transfer function (OTF) against the monochromatic light-ray of the embodiment of FIG. 5.
Figure 7:
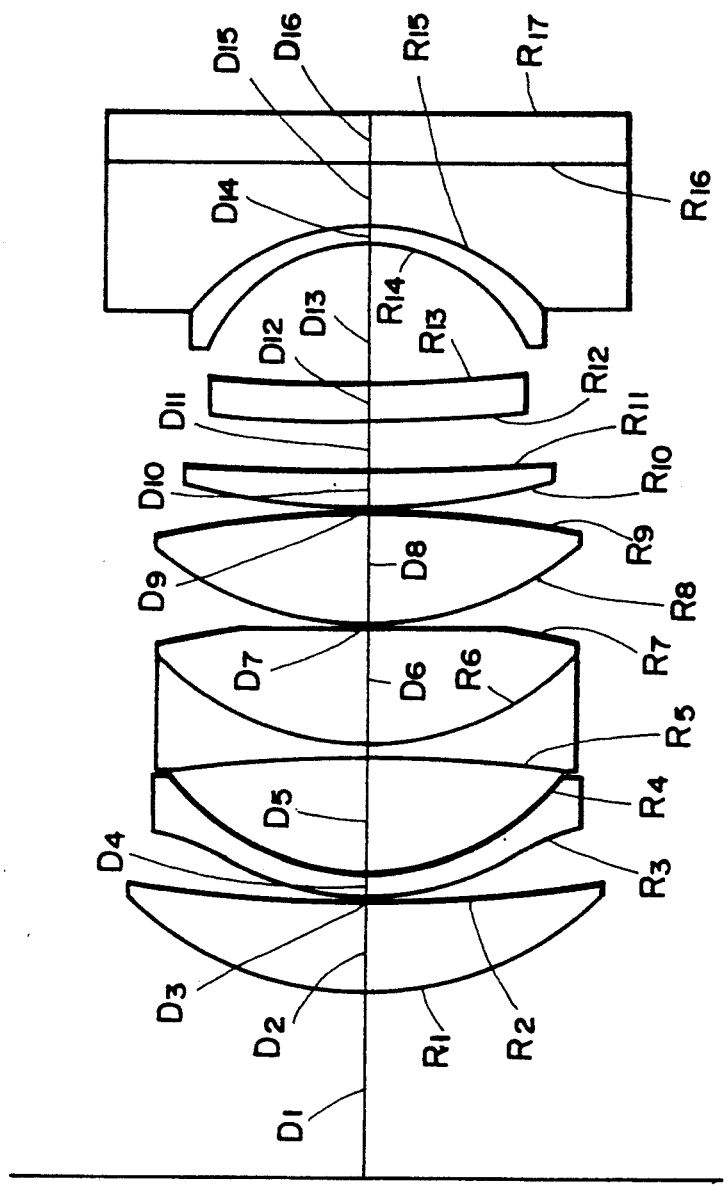
FIG. 7 is a side view of a fourth embodiment of this invention.
Figure 8:
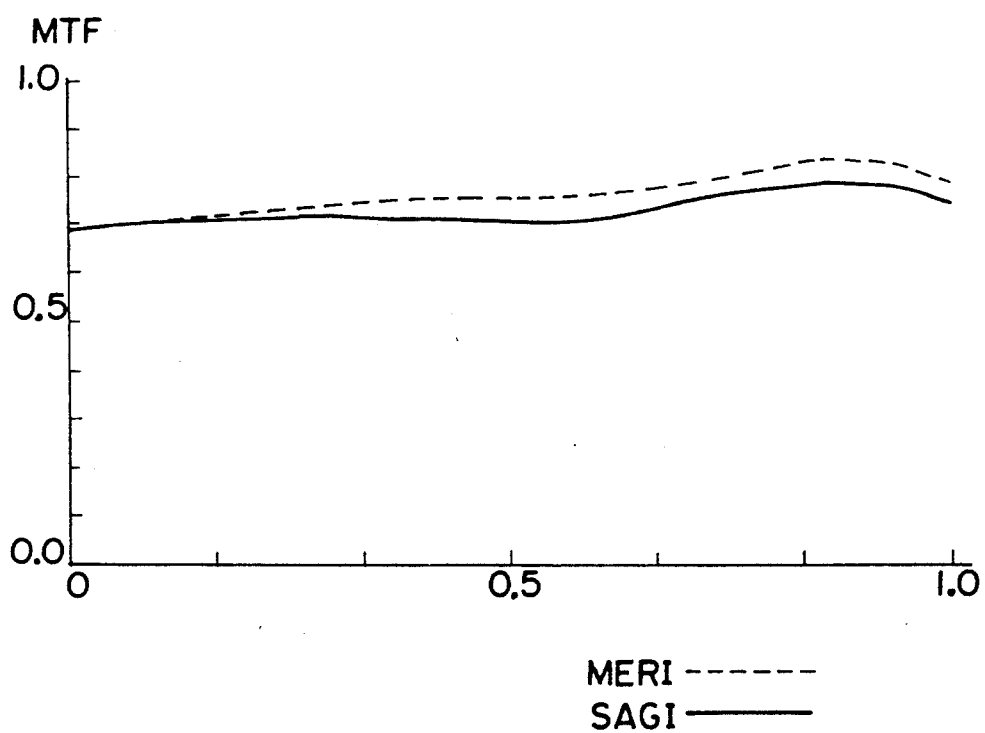
FIG. 8 is a diagram showing an optical transfer function (OTF) against the monochromatic light-ray of the embodiment of FIG. 7.
Figure 10:
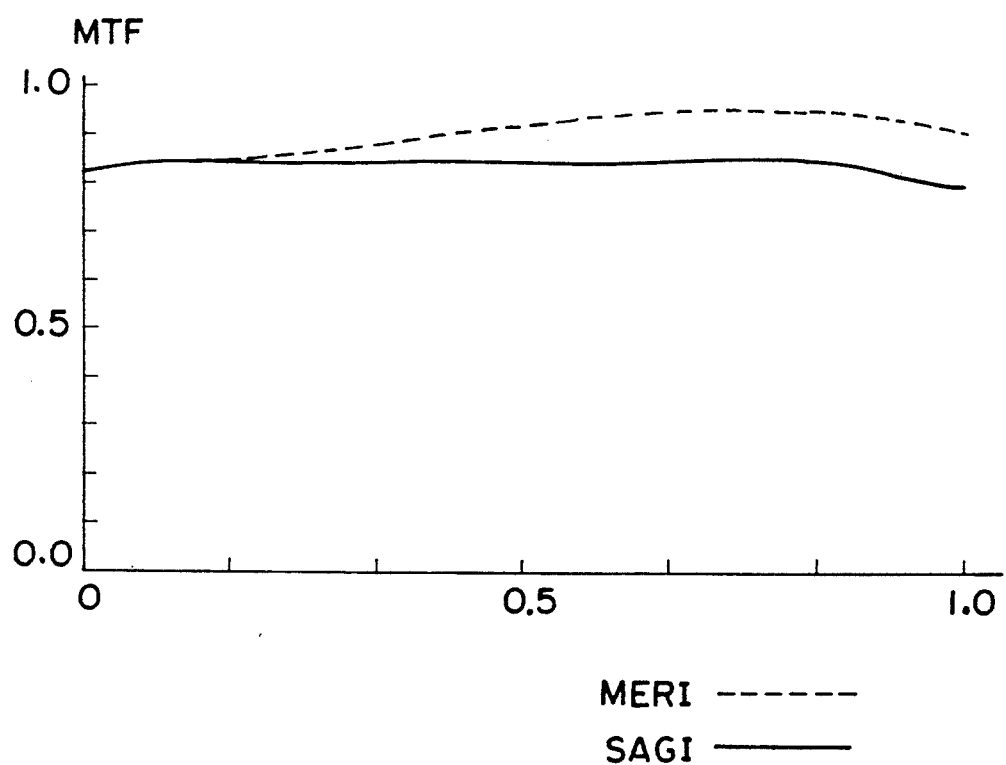
FIG. 10 is a diagram showing an optical transfer function (OTF) against the monochromatic light-ray of the embodiment of FIG. 9.
Figure 11:
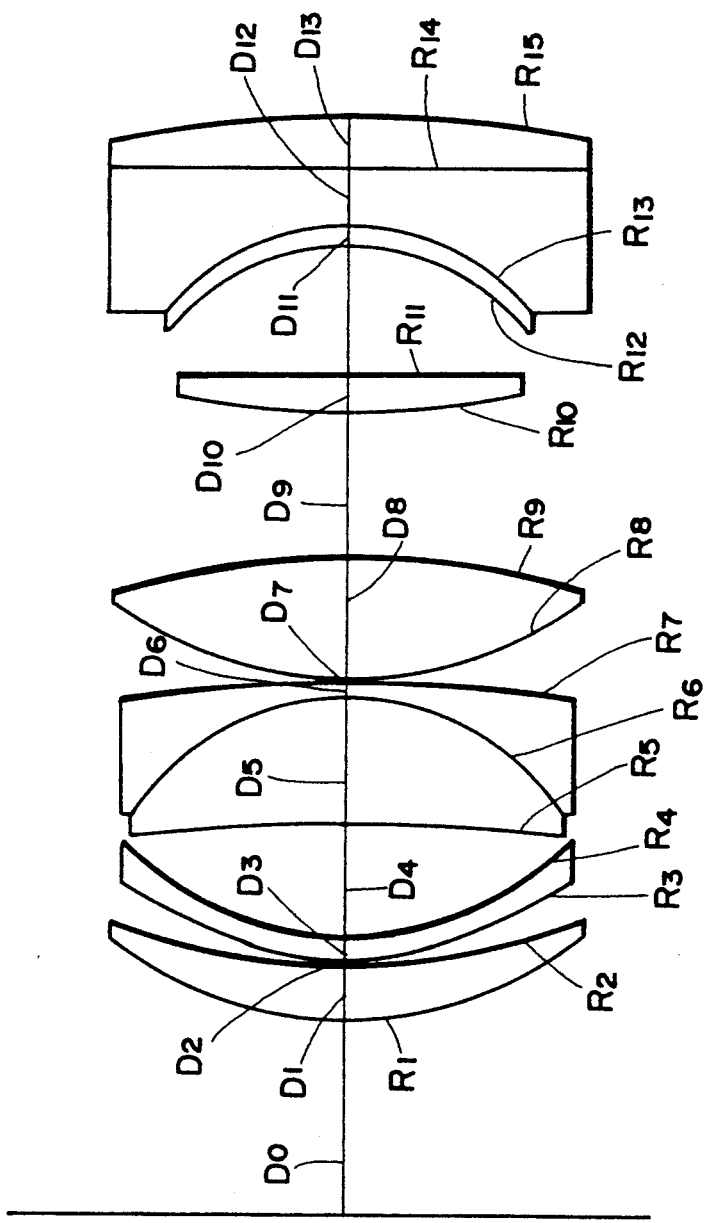
FIG. 11 is a side view of a sixth embodiment of this invention.
Figure 12:
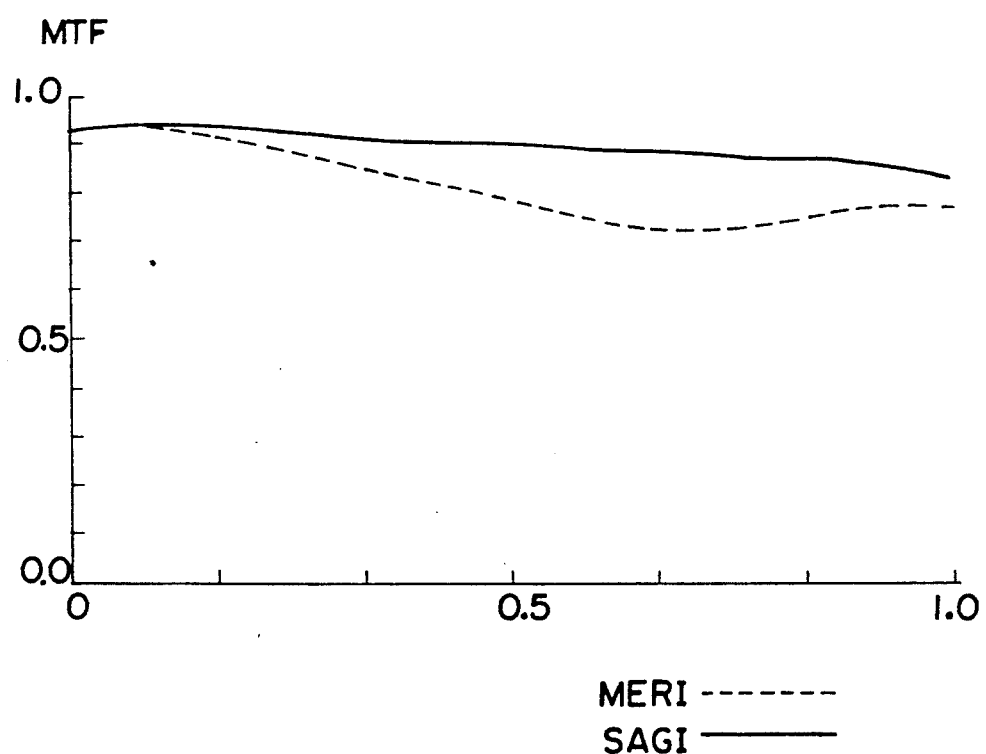
FIG. 12 is a diagram showing an optical transfer function (OTF) against the monochromatic light-ray of the embodiment of FIG. 11.

Preferred embodiments of this invention will now be described in detail by referring to the accompanying drawings, wherein all the embodiments satisfy the following conditions:

| | |
|---|---|
| Screen size: | 254 cm (100 inches) in diagonal |
| Magnification of projection: | 20 times |
| F number: | 1,03 or less |
| Ratio of relative illumination: | |
| more than 35% at diagonal points, and the evaluation of each embodiment has been implemented by use of a Modulation Transfer Function (MTF), wherein | |
| Frequency: | 600 TV lines |
| and, in an Optical Transfer Function (OTF) diagram, a dashed line designates a meridional while a solid line designates a sagital. | |

The evaluation is subjected to green light-rays emitted by green fluorescent materials, and wave lengths and color weights (intensity ratio) are:

| wave length (nm) | weight |
|---|---|
| 490 | 0.14 |
| 520 | 0.19 |
| 545 | 0.44 |
| 555 | 0.17 |
| 600 | 0.06 |

Further, a shape of an aspheric surface, in rectangular coordinates having an optical axis at the Z-axis, is given by the following equation when a paraxial curvature at the vertex is R, a conic constant is K and aspheric surface constants of higher order are $A_4$, $A_6$, $A_8$ and $A_{10}$:

$$Z = \frac{H^2/R}{1 + \sqrt{1 - (K + 1)(H/R)^2}} + A_4 H^4 + A_6 H^6 + A_8 H^8 + A_{10} H^{10}$$

$$H = \sqrt{X^2 + Y^3}$$

where, the given surface is an aspheric surface of rotation symmetry.

Further, in the preferred embodiments hereinafter described, designated are:

R; Radius of curvature of each surface of lenses and a face plate of an projection cathode-ray tube D; Thickness and air gap along the optical center axis of each lens and the face plate of the projection cathode-ray tube $N_d$; Index of refraction of each lens and air gap against the e-ray $\nu_d$; Abbe's number of each lens Preferred embodiments will now described more specifically.

A radius of curvature or paraxial curvature at the vertex R, a thickness or air gap D, an index of refraction $N_d$ and an Abbe's number $\nu_d$ are:

|    | R          | D       | Nd      | νd   |
|----|------------|---------|---------|------|
| 0  |            | 2807.40 |         |      |
| 1  | 125.106    | 20.12   | 1.58913 | 61.3 |
| 2  | 710.487    | 11.72   |         |      |
| 3  | 113.059    | 6.00    | 1.49037 | 58.2 |
| 4  | 97.110     | 21.34   |         |      |
| 5  | 12069.439  | 4.00    | 1.62004 | 36.3 |
| 6  | 64.778     | 33.37   | 1.58913 | 61.3 |
| 7  | 327.315    | 3.36    |         |      |
| 8  | 120.004    | 27.40   | 1.58913 | 61.3 |
| 9  | −183.192   | 15.24   |         |      |
| 10 | −404.529   | 10.00   | 1.48928 | 58.5 |
| 11 | −140.017   | 40.45   |         |      |
| 12 | −67.626    | 5.00    | 1.48874 | 58.2 |
| 13 | −68.000    | 15.00   | 1.43660 | 63.8 |
| 14 |            | 14.10   | 1.55206 | 57.0 |
| 15 | −350.000   |         |         |      | where, the third, eleventh and twelfth surfaces are aspheric and aspheric coefficients of which are:

|     | 3rd surface              | 11th surface             | 12th surface             |
|-----|--------------------------|--------------------------|--------------------------|
| K   | 0.0                      | 0.0                      | 0.0                      |
| A4  | $-0.20119 \times 10^{-6}$ | $-0.13072 \times 10^{-6}$ | $-0.63363 \times 10^{-6}$ |
| A6  | $-0.29868 \times 10^{-10}$ | $-0.12093 \times 10^{-9}$ | $0.23182 \times 10^{-9}$ |
| A8  | $-0.73190 \times 10^{-14}$ | $0.61249 \times 10^{-13}$ | $-0.90220 \times 10^{-13}$ |
| A10 | $0.70563 \times 10^{-16}$ | $-0.11998 \times 10^{-16}$ | $0.82817 \times 10^{-17}$ | where, the lens power $\psi d$ and Abbe's number $\nu d$ of each lens group are:

$\psi 1 = 0.53$
$\psi 2 = -0.09$
$\psi 3 = -0.31$    $\psi 3x = -0.06$    $\nu 3x = 36.3$
$\psi 4,5 = 1.29$    $\psi 5 = 0.31$
$\psi 6 = -0.87$

First Embodiment

Materials to be utilized in a projection lens according to this embodiment are:

| Lens Group material | 1 | 2 | 3     | 4 | 5 | 6 |
|---------------------|---|---|-------|---|---|---|
|                     | G | P | G + G | G | P | P | where, G = Glass-lens and P = Plastic-lens.

Second Embodiment

Materials to be utilized in a projection lens according to this embodiment are:

| Lens Group material | 1 | 2 | 3     | 4 | 5 | 6 |
|---------------------|---|---|-------|---|---|---|
|                     | P | P | P + P | G | P | P |

The radius of curvature or the paraxial curvature at the vertex R, the thickness or air gap D, the index of refraction $N_d$ and the Abbe's number $\nu_d$ are:

|    | R           | D       | Nd      | νd   |
|----|-------------|---------|---------|------|
| 0  |             | 2816.10 |         |      |
| 1  | 115.356     | 21.43   | 1.49037 | 58.2 |
| 2  | 400.932     | 10.89   |         |      |
| 3  | 93.672      | 6.00    | 1.49037 | 58.2 |
| 4  | 90.576      | 22.09   |         |      |
| 5  | −13689.826  | 4.00    | 1.58557 | 30.0 |
| 6  | 78.121      | 26.61   | 1.49037 | 58.2 |
| 7  | 455.269     | 1.00    |         |      |
| 8  | 117.500     | 31.98   | 1.58913 | 61.3 |
| 9  | −155.635    | 28.82   |         |      |
| 10 | −480.479    | 10.00   | 1.48928 | 58.5 |
| 11 | −145.335    | 31.50   |         |      |
| 12 | −57.948     | 5.00    | 1.48874 | 58.2 |
| 13 | −65.000     | 15.00   | 1.43660 | 63.8 |
| 14 |             | 14.10   | 1.55206 | 57.0 |
| 15 | −350.000    |         |         |      | where, the first, third, seventh, eleventh and twelfth surfaces are aspheric and aspheric coefficients of which are:

|    | 1st surface              | 3rd surface              | 7th surface              |
|----|--------------------------|--------------------------|--------------------------|
| K  | 0.0                      | 0.0                      | 0.0                      |
| A4 | $0.82623 \times 10^{-7}$ | $-0.38011 \times 10^{-6}$ | $0.12836 \times 10^{-7}$ |
| A6 | $-0.51780 \times 10^{-11}$ | $-0.12848 \times 10^{-10}$ | $-0.19602 \times 10^{-10}$ |

-continued

| A8 | $0.17330 \times 10^{-14}$ | $-0.29340 \times 10^{-13}$ | $-0.43130 \times 10^{-14}$ |
| A10 | $0.37008 \times 10^{-19}$ | $0.35475 \times 10^{-17}$ | $0.14965 \times 10^{-17}$ |

| | 11th surface | 12th surface |
|---|---|---|
| K | 0.0 | 0.0 |
| A4 | $0.38203 \times 10^{-7}$ | $0.20996 \times 10^{-7}$ |
| A6 | $-0.12903 \times 10^{-10}$ | $0.91967 \times 10^{-11}$ |
| A8 | $0.72437 \times 10^{-14}$ | $0.10826 \times 10^{-13}$ |
| A10 | $-0.16859 \times 10^{-17}$ | $0.57428 \times 10^{-17}$ | where, the lens power $\psi d$ and Abbe's number $\nu d$ of each lens group are:

$\psi 1 = 0.42$
$\psi 2 = 0.01$
$\psi 3 = -0.32$    $\psi 3x = -0.18$    $\psi 3x = 30.0$
$\psi 4,5 = 1.33$   $\psi 5 = 0.32$
$\psi 6 = -1.03$

Third Embodiment

Materials to be utilized in a projection lens according to this embodiment are:

| Lens Group material | 1 | 2 | 3 | 4 | 5 | 6 |
|---|---|---|---|---|---|---|
| | P | P | P + P | G | P | P |

The radius of curvature or the paraxial curvature at the vertex R, the thickness or air gap D, the index of refraction $N_d$ and the Abbe's number $\nu_d$ are:

| | R | D | Nd | νd |
|---|---|---|---|---|
| 0 | | 2877.10 | | |
| 1 | 112.386 | 25.74 | 1.49037 | 58.2 |
| 2 | 338.825 | 1.00 | | |
| 3 | 76.436 | 6.00 | 1.49037 | 58.2 |
| 4 | 771.64 | 26.59 | | |
| 5 | −2557.699 | 4.00 | 1.58557 | 30.0 |
| 6 | 69.258 | 31.63 | 1.49037 | 58.2 |
| 7 | 464.659 | 1.00 | | |
| 8 | 99.844 | 34.55 | 1.58913 | 61.3 |
| 9 | −184.492 | 19.63 | | |
| 10 | 255.391 | 10.00 | 1.48928 | 58.5 |
| 11 | 1010.030 | 37.58 | | |
| 12 | −49.762 | 5.00 | 1.48874 | 58.2 |
| 13 | −60.000 | 15.00 | 1.43660 | 63.8 |
| 14 | | 10.30 | 1.55206 | 57.0 |
| 15 | | | | | where, the first, third, seventh, elventh and twelfth surfaces are aspheric and aspheric coefficients of which are:

| | 1st surface | 3rd surface | 7th surface |
|---|---|---|---|
| K | 0.0 | 0.0 | 0.0 |
| A4 | $0.19635 \times 10^{-6}$ | $-0.53202 \times 10^{-6}$ | $-0.72188 \times 10^{-7}$ |
| A6 | $-0.12315 \times 10^{-10}$ | $-0.10469 \times 10^{-10}$ | $-0.54865 \times 10^{-10}$ |
| A8 | $0.32163 \times 10^{-14}$ | $-0.37458 \times 10^{-13}$ | $0.75315 \times 10^{-14}$ |
| A10 | $-0.62724 \times 10^{-20}$ | $0.36940 \times 10^{-17}$ | $-0.21447 \times 10^{-18}$ |

| | 11th surface | 12th surface |
|---|---|---|
| K | 0.0 | 0.0 |
| A4 | $0.25169 \times 10^{-6}$ | $-0.10410 \times 10^{-5}$ |
| A6 | $-0.31203 \times 10^{-9}$ | $0.73614 \times 10^{-9}$ |
| A8 | $0.21362 \times 10^{-12}$ | $-0.26902 \times 10^{-12}$ |
| A10 | $-0.55256 \times 10^{-16}$ | $0.83176 \times 10^{-16}$ | where, the lens power $\psi d$ and Abbe's number $\nu d$ of each lens group are:

$\psi 1 = 0.41$
$\psi 2 = 0.03$
$\psi 3 = -0.37$    $\psi 3x = -0.22$    $\nu 3x = 30.0$
$\psi 4,5 = 1.32$   $\psi 5 = 0.20$
$\psi 6 = -1.21$

Fourth Embodiment

Materials to be utilized in a projection lens according to this embodiment are:

| Lens Group material | 1 | 2 | 3 | 4 | 5 | 6 |
|---|---|---|---|---|---|---|
| | P | P | P + P | G + G | P | P |

The radius of curvature or the paraxial curvature at the vertex R, the thickness or air gap D, the index of refraction $N_d$ and the Abbe's number $\nu_d$ are:

| R | D | Nd | νd |
|---|---|---|---|

-continued

|    | R        | D       | Nd      | vd   |
|----|----------|---------|---------|------|
| 0  |          | 2873.50 |         |      |
| 1  | 114.445  | 23.93   | 1.49037 | 58.2 |
| 2  | 429.377  | 1.00    |         |      |
| 3  | 74.862   | 6.00    | 1.49037 | 58.2 |
| 4  | 71.846   | 31.32   |         |      |
| 5  | −445.934 | 4.00    | 1.58557 | 30.0 |
| 6  | 84.458   | 31.54   | 1.49037 | 58.2 |
| 7  | 4413.017 | 1.00    |         |      |
| 8  | 100.640  | 29.67   | 1.58913 | 61.3 |
| 9  | −309.463 | 1.00    |         |      |
| 10 | 227.188  | 9.08    | 1.58913 | 61.3 |
| 11 | 705.373  | 13.17   |         |      |
| 12 | 437.044  | 10.00   | 1.48928 | 58.5 |
| 13 | 1398.595 | 37.18   |         |      |
| 14 | −50.915  | 5.00    | 1.48874 | 58.2 |
| 15 | −65.000  | 15.00   | 1.54660 | 63.8 |
| 16 |          | 14.10   | 1.55206 | 57.0 |
| 17 |          |         |         |      | where, the first, third, seventh, thirteenth and fourteenth surfaces are aspheric and aspheric coefficients of which are:

|     | 1st surface              | 3rd surface              | 7th surface              |
|-----|--------------------------|--------------------------|--------------------------|
| K   | 0.0                      | 0.0                      | 0.0                      |
| A4  | $0.19390 \times 10^{-6}$ | $-0.54609 \times 10^{-6}$ | $-0.15860 \times 10^{-6}$ |
| A6  | $-55931 \times 10^{-11}$ | $-0.36923 \times 10^{-11}$ | $-0.95835 \times 10^{-10}$ |
| A8  | $0.50354 \times 10^{-15}$ | $-0.39201 \times 10^{-13}$ | $0.22910 \times 10^{-13}$ |
| A10 | $0.32444 \times 10^{-18}$ | $0.28825 \times 10^{-17}$ | $-0.34850 \times 10^{-17}$ |

|     | 13th surface              | 14th surface              |
|-----|---------------------------|---------------------------|
| K   | 0.0                       | 0.0                       |
| A4  | $0.49521 \times 10^{-6}$  | $-0.33219 \times 10^{-6}$ |
| A6  | $-0.31526 \times 10^{-9}$ | $-0.16638 \times 10^{-10}$ |
| A8  | $0.22888 \times 10^{-12}$ | $0.14466 \times 10^{-12}$ |
| A10 | $-0.64687 \times 10^{-16}$ | $0.36326 \times 10^{-16}$ | where, the lens power $\psi d$ and Abbe's number $\nu d$ of each lens group are:

$\psi 1 = 0.44$
$\psi 2 = -0.01$
$\psi 3 = -0.35$    $\psi 3x = -0.34$    $\nu 3x = 20.0$
$\psi 4,5 = 1.32$    $\psi 5 = 0.11$
$\psi 6 = -1.19$

Fifth Embodiment

Materials to be utilized in a projection lens according to this embodiment are:

| Lens Group | 1 | 2 | 3 | 4 | 5 | 6 |
|---|---|---|---|---|---|---|
| material | P | P | P + P | G | P | G |

The radius of curvature or the paraxial curvature at the vertex R, the thickness or air gap D, the index of refraction $N_d$ and the Abbe's number $\nu_d$ are:

|    | R         | D       | Nd      | vd   |
|----|-----------|---------|---------|------|
| 0  |           | 2827.53 |         |      |
| 1  | 115.569   | 25.00   | 1.49037 | 58.2 |
| 2  | 329.710   | 2.69    |         |      |
| 3  | 94.738    | 6.00    | 1.49037 | 58.2 |
| 4  | 91.890    | 21.61   |         |      |
| 5  | 1476.010  | 4.00    | 1.58557 | 30.0 |
| 6  | 78.085    | 26.55   | 1.49037 | 58.2 |
| 7  | 322.360   | 1.00    |         |      |
| 8  | 113.538   | 33.87   | 1.58913 | 61.3 |
| 9  | −160.161  | 31.18   |         |      |
| 10 | −442.040  | 10.00   | 1.48928 | 58.5 |
| 11 | −131.533  | 31.50   |         |      |
| 12 | −65.636   | 5.00    | 1.62004 | 36.3 |
| 13 | −150.000  | 15.00   | 1.43660 | 63.8 |
| 14 |           | 14.10   | 1.55206 | 57.0 |
| 15 | −350.000  |         |         |      | where, the first, third, seventh and eleventh surfaces are aspheric and aspheric coefficients of which are:

|     | 1st surface               | 3rd surface                | 7th surface                |
|-----|---------------------------|----------------------------|----------------------------|
| K   | 0.0                       | 0.0                        | 0.0                        |
| A4  | $0.95954 \times 10^{-7}$  | $-0.36755 \times 10^{-6}$  | $0.48342 \times 10^{-7}$   |
| A6  | $-0.74753 \times 10^{-11}$ | $-0.56833 \times 10^{-11}$ | $-0.68339 \times 10^{-11}$ |
| A8  | $0.18701 \times 10^{-14}$ | $-0.22046 \times 10^{-13}$ | $-0.62994 \times 10^{-14}$ |
| A10 | $0.32032 \times 10^{-20}$ | $0.24472 \times 10^{-17}$  | $0.16230 \times 10^{-17}$  |

-continued

|  | 11th surface |
|---|---|
| K | 0.0 |
| A4 | $0.68692 \times 10^{-7}$ |
| A6 | $0.32993 \times 10^{-10}$ |
| A8 | $-0.11425 \times 10^{-13}$ |
| A10 | $0.33152 \times 10^{-17}$ | where, the lens power $\psi d$ and Abbe's number $\nu d$ of each lens group are:
$\psi 1 = 0.39$
$\psi 2 = -1.01$
$\psi 3 = -0.32$        $\psi 3x = -0.12$        $\nu 3x = 30.0$
$\psi 4,5 = 1.34$       $\psi 5 = 0.36$
$\psi 6 = -1.11$

Sixth Embodiment

Materials to be utilized in a projection lens according to this embodiment are:

| Lens Group | 1 | 2 | 3 | 4 | 5 | 6 |
|---|---|---|---|---|---|---|
| material | P | P | P + P | G | P | P |

The radius of curvature or the paraxial curvature at the vertex R, the thickness or air gap D, the index of refraction $N_d$ and the Abbe's number $\nu_d$ are:

|  | R | D | Nd | νd |
|---|---|---|---|---|
| 0 |  | 2810.373 |  |  |
| 1 | 127.081 | 14.92 | 1.49037 | 58.2 |
| 2 | 192.429 | 1.00 |  |  |
| 3 | 84.047 | 6.00 | 1.49037 | 58.2 |
| 4 | 90.877 | 29.98 |  |  |
| 5 | −664.401 | 35.00 | 1.49037 | 58.2 |
| 6 | −73.576 | 4.00 | 1.58557 | 30.0 |
| 7 | −486.821 | 1.00 |  |  |
| 8 | 118.724 | 32.35 | 1.58913 | 61.3 |
| 9 | −237.182 | 36.70 |  |  |
| 10 | 246.016 | 10.00 | 1.48928 | 58.5 |
| 11 | −904.592 | 34.01 |  |  |
| 12 | −61.861 | 5.00 | 1.48874 | 58.2 |
| 13 | −70.000 | 15.00 | 1.43660 | 63.8 |
| 14 |  | 14.10 | 1.55206 | 57.0 |
| 15 | −350.000 |  |  |  | where, the first, third, seventh, eleventh and twelfth surfaces are aspheric and aspheric coefficients of which are:

|  | 1st surface | 3rd surface | 7th surface |
|---|---|---|---|
| K | 0.0 | 0.0 | 0.0 |
| A4 | $0.21553 \times 10^{-6}$ | $-0.41570 \times 10^{-6}$ | $-0.22248 \times 10^{-7}$ |
| A6 | $-0.21204 \times 10^{-10}$ | $0.53202 \times 10^{-11}$ | $0.48507 \times 10^{-11}$ |
| A8 | $0.36278 \times 10^{-14}$ | $-0.10494 \times 10^{-13}$ | $-0.33374 \times 10^{-14}$ |
| A10 | $-0.18631 \times 10^{-18}$ | $0.87057 \times 10^{-18}$ | $0.83122 \times 10^{-18}$ |

|  | 11th surface | 12th surface |
|---|---|---|
| K | 0.0 | 0.0 |
| A4 | $-0.32407 \times 10^{-6}$ | $0.12378 \times 10^{-6}$ |
| A6 | $-0.32407 \times 10^{-7}$ | $-0.44256 \times 10^{-11}$ |
| A8 | $0.20791 \times 10^{-13}$ | $0.38857 \times 10^{-13}$ |
| A10 | $-0.43719 \times 10^{-17}$ | $-0.46958 \times 10^{-17}$ | where, the lens power $\psi d$ and Abbe's number $\nu d$ of each lens group are:
$\psi 1 = 0.19$
$\psi 2 = 0.08$
$\psi 3 = -0.12$        $\psi 3x = -0.02$        $\nu 3x = 30.0$
$\psi 4,5 = 1.19$       $\psi 5 = 0.34$
$\psi 6 = -0.97$ The material utilized for the plastic lenses is acrylic resin such as poly-methyl-methacrylate (PMMA). The material utilized for the achromatic lenses, except the first embodiment, is poly-carbonate or polystyrol.

Temperature characteristics of the plastic lenses are taken into account in all the preferred embodiments as described above. Since the refractive index of the plastic in use is compensated for temperature variation, it is possible to minimize the worsening of the efficiency due to the temperature variation, even, of the projection lenses comprising six plastic component lenses and one glass component lens, which have seven component lenses in total and employed in the second, third and sixth embodiments, and further it is possible to provide a light weight projection lens by reducing the component lenses in weight.

All the lenses as described above are achromatized and are high performance projection lenses having an approximate value of 80% of MTF characteristic at 600 TV lines. Accordingly, these projection lenses are well suited for use in a high definition television system or a Hi-vision system.

Since the second and fifth lens groups in each preferred embodiment as described above are employing plastic lenses, if the lens power of each group exceeds the range specified in the appended claims, the temperature characteristics will be worsened accordingly.

Further, if the first lens group is prepared by plastic, it is necessary to employ the plastic for the third lens group in order to compensate the temperature distortion.

Hence, the first and third lens groups bear on conditions not only for improving performance but for compensating temperature characteristics.

In the embodiments described above, the sixth lens group and the projection cathode-ray tube are optically coupled, however, it is obvious to those skilled in the art that an air gap may be provided therebetween.

Further, in the embodiments described above, a bonding layer in the third bonded lens group has a thickness of 0 mm, however, it is also obvious to those skilled in the art that the third lens group may be designed in anticipation of an optical coupling neither providing the bonding layer nor bonding element lenses.

As it has been described above, in accordance with this invention, since a projection lens can be provided by employing only six lens groups while maintaining a high aperture ratio and high imaging power, there will be no abrupt change for worsening peripheral imaging performance and that provided is a low production cost.

Further, in accordance with this invention, since the variation of refractive index to be caused by a change of temperature can be canceled amongst the component lenses, there will be provided a projection lens with no movement of focal point and no decrease of imaging power under the change of temperature, such as, caused by a heat caused by the projection cathode-ray tube.

The present invention can also be defined such that; a projection lens comprising, from a projection screen side in order, a first lens group, a second lens group, a third lens group, a fourth lens group, a fifth lens group and a sixth lens group, wherein the first lens group consists of a lens element having a positive lens power at or less than one half of a combined lens power of the fourth and fifth lens groups, the second lens group consists of a meniscus lens element having at least one aspheric surface for compensating an aperture aberration, the third lens group consists of a bonded lens having a negative lens power, one piece of which bonded lens is a negative lens having an Abbe's number of less than 40, the fourth lens group consists of a lens element that provides the majority of positive lens power of the projection lens, the fifth lens group consists of a lens element for compensating at least an astigmatism and the sixth lens group consists of a lens element having a strongly concave and at least one aspheric image side surface for correcting field curvature.

In the projection lens above, only the fourth lens group can be made of glass and/or the first, second, third, fifth and sixth lens groups are of plastic.

It is to be understood that the condition defined in the claim 2 is based on the embodiments described above, however, it is apparent for those skilled in the art that various changes and modifications may be made in providing the achromatic lens such as by bonding a convex lens having a large Abbe's number $\nu d_1$ with a concave lens having a small Abbe's number $\nu d_2$. In this case, it is preferable to select two kinds of glass having the Abbe's numbers of $\nu d_1$ and $\nu d_2$ apart as much as possible in view of other aberrations. Because, in such lenses, it is possible to provide an achromatic bonded lens having large radii of curvatures at the surfaces since focal distances $f_1$ and $f_2$ thereof are made relatively large enough.

Accordingly, it is to be understood by those skilled in the art that the foregoing description relates only to preferred embodiments of the invention and that various changes and modifications may be made in the invention without departing from the spirit and scope thereof.

What is claimed is:

1. A projection lens comprising, from a projection screen side in order, a first lens group, a second lens group, a third lens group, a fourth lens group, a fifth lens group and a sixth lens group, wherein
said first lens group consists of a lens element having a positive lens power at or less than one half of a combined lens power of said fourth and fifth lens groups;
said second lens group consists of a meniscus lens element having at least one non-spherical surface for compensating an aperture aberration;
said third lens group consists of a bonded lens having a negative lens power, one piece of which bonded lens is a negative lens having an Abbe's number of less than 40;
said fourth lens group consists of a lens element that provides the majority of positive lens power of the projection lens;
said fifth lens group consists of a lens element for compensating at least an astigmatism; and
said sixth lens group consists of a lens element having a strongly concave and at least one aspheric image side surface for correcting field curvature.

2. A projection lens as defined in claim 1, wherein only said fourth lens group is made of glass.

3. A projection lens as defined in claim 1, wherein said first, second, third, fifth and sixth lens groups are made of plastic.

4. A projection lens comprising, from a projection screen side in order, a first lens group including a positive lens, a second lens group including a meniscus type lens having a comparatively low refractive power, a third lens group including a bonded negative lens, a fourth lens group including a double convex lens, a fifth lens group including a lens having a comparatively low positive refractive power and a sixth lens group including a negative lens having a concave surface at the screen side, whereby satisfying the underwritten conditions of a–e:

| | |
|---|---|
| $0.1 < \psi_1 < 0.6$ | a |
| $-0.2 < \psi_2 < 0.2$ | b |
| $-0.5 < \psi_3 < -0.1$ | c |
| $1.0 < \psi_{4,5} < 1.5$ | d |
| $-1.3 < \psi_6 < -0.7$ | e | where,
$\psi_1$; lens power of the first lens group
$\psi_2$; lens power of the second lens group
$\psi_3$; lens power of the third lens group $\psi_{4,5}$; combined lens power of the fourth and fifth lens groups $\psi_6$; lens power of the sixth lens group the lens power of the whole lens system being 1.

5. A projection lens as defined in claim 4, wherein one of the bonded lens of said third lens group further satisfies the following conditions:

$$-0.7 < \psi_{3X} < 0$$

$$\nu_{3X} < 40$$

where, $\psi_{3X}$; lens power of one piece of the bonded lens of said third lens group, the lens power of the whole lens system being 1 and $\nu_{3X}$; Abbe's number of the lens.

6. A projection lens as defined in claim 5, wherein at least one surface of component lenses which constitute at least said second and fifth lens groups out of said second, fifth and sixth lens groups is formed into an aspheric surface.

7. A projection lens as defined in claim 5 or 6, wherein at least said second and fifth lens groups out of said second, fifth and sixth lens groups are composed of plastic component lenses and said fifth lens group satisfies the condition $$0 < \psi_5 < 0.4$$

where, $\psi_5$; lens power of said fifth lens group the lens power of the whole lens system being 1.

8. A projection lens as defined in claim 4, 5 or 6, wherein said sixth lens group is arranged in the proximity of a projection cathode-ray tube, a display screen of which is formed into a concave spherical or aspheric shape at the side facing to the projection screen.

9. A projection lens as defined in claim 5, wherein at least component lenses of said first, second, third and fifth lens groups out of the component lenses that constitute said first, second, third, fifth and sixth lens groups are composed of plastic lenses and said fifth lens group satisfies the condition $$0 < \psi_5 < 0.4.$$

10. A projection lens as defined in claim 9, wherein at least one surface of the component lenses of, at least, said second and fifth lens groups out of the component lenses constituting said first, second, third, fifth and sixth lens groups is formed into an aspheric surface.

11. A projection lens as defined in claim 9 or 10, wherein said sixth lens group is arranged in the proximity of a projection cathode-ray tube, a display screen of which is formed into a concave spherical or aspheric shape at the side facing to the projection screen.

* * * * *